United States Patent [19]
Carr et al.

[11] Patent Number: 6,076,612
[45] Date of Patent: Jun. 20, 2000

[54] TRANSITION FROM POSITION TO DRAFT MODE CONTROLLED BY HITCH POSITION COMMAND AND FEEDBACK

[75] Inventors: Donald D. Carr, Rochert, Minn.; Michael Stelzle, Aurora; William L. Schubert, Downers Grove, both of Ill.

[73] Assignee: Case Corporation, Racine, Wis.

[21] Appl. No.: 09/386,559

[22] Filed: Aug. 31, 1999

[51] Int. Cl.⁷ .................................................. A01B 63/112
[52] U.S. Cl. .................................................. 172/7; 701/50
[58] Field of Search .................................. 701/50; 172/2, 172/3, 4, 4.5, 7, 8, 9, 10, 11, 12

[56] References Cited

U.S. PATENT DOCUMENTS

| | | | |
|---|---|---|---|
| 3,246,701 | 4/1966 | Schulz ........................................ | 172/9 |
| 3,422,906 | 1/1969 | Bunting et al. ............................. | 172/9 |
| 3,653,446 | 4/1972 | Kalmon ...................................... | 172/4 |
| 4,300,638 | 11/1981 | Katayama et al. ......................... | 172/10 |
| 4,508,176 | 4/1985 | Wiegardt et al. .......................... | 172/7 |
| 4,518,044 | 5/1985 | Wiegardt et al. .......................... | 172/7 |
| 4,969,527 | 11/1990 | Boe et al. ................................... | 172/7 |
| 4,979,092 | 12/1990 | Bergene et al. ........................ | 172/3 X |
| 5,224,551 | 7/1993 | Sukup ..................................... | 172/2 X |
| 5,291,407 | 3/1994 | Young et al. ............................ | 172/7 X |
| 5,320,186 | 6/1994 | Strosser et al. ............................. | 172/8 |
| 5,421,416 | 6/1995 | Orbach et al. .............................. | 172/4 |
| 5,469,921 | 11/1995 | Orbach et al. .............................. | 172/4 |
| 5,472,056 | 12/1995 | Orbach ........................................ | 172/2 |
| 5,549,166 | 8/1996 | Orbach et al. .............................. | 172/4 |
| 5,684,691 | 11/1997 | Orbach et al. .......................... | 172/2 X |
| 5,810,095 | 9/1998 | Orbach et al. .............................. | 172/2 |
| 5,899,279 | 5/1999 | Bennett et al. ............................. | 172/7 |
| 5,903,988 | 5/1999 | Tochizawa et al. .................. | 701/50 X |
| 5,911,769 | 6/1999 | Orbach et al. ............................ | 701/50 |

OTHER PUBLICATIONS

Electro–Hydraulic Draft Control (EDC) System Description for a Variety of Tractors; Abraham Orbach (J.I. Case); SAE Technical Paper 941764; Presented at International Off–Highway & Powerplant Congress & Exposition, Milwaukee, WI, Sep. 12–14, 1994.

*Primary Examiner*—Christopher J. Novosad
*Attorney, Agent, or Firm*—Foley & Lardner

[57] ABSTRACT

A hitch assembly control system for an off-highway vehicle such as an agricultural tractor is operable in both position and draft control modes. The control system is capable of transitioning from the position mode to the draft mode, and from the draft mode to the position mode, under particular conditions. For the transition from position to draft mode, these conditions include a target hitch position being greater than both a hitch position command and a hitch position feedback. For the transition from draft to position mode, these conditions include the hitch position command being greater than the hitch position plus a hysteresis factor, or less than the hitch position command that existed back at the transition into the draft mode.

17 Claims, 4 Drawing Sheets

TRANSITION FROM POSITION TO DRAFT MODE CONTROLLED BY HITCH POSITION COMMAND AND FEEDBACK

RELATED DOCUMENTATION

This application includes an appendix which shows a software implementation of an embodiment of the invention.

A portion of the disclosure of this patent document contains material which is subject to a claim of copyright protection. The copyright owner has no objection to the reproduction by anyone of the patent document or the patent disclosure as it appears in the Patent and Trademark Office Patent file or records, but otherwise reserves all other rights whatsoever thereto.

Subject matter disclosed herein is related to the subject matter disclosed in U.S. Pat. No. 5,549,166 entitled HITCH ASSEMBLY CONTROL SYSTEM issued to Orbach et al. on Aug. 27, 1996, the disclosure of which is incorporated herein by reference.

FIELD OF THE INVENTION

The present invention generally relates to hitch assemblies connected to the frames of off-highway work vehicles. More particularly, the present invention relates to an electronic control system for controlling operations of a hitch assembly.

BACKGROUND OF THE INVENTION

Various types of hitch assembly control systems for work vehicles such as agricultural tractors have been proposed, designed, and used. Among the main objective of such systems is the need to regulate the elevation of the hitch with respect to the vehicle main frame, which also serves to regulate the position of the implement (e.g., a plow) attached to the hitch assembly during operation. Typically, such hitch assembly control systems have been operable in any of a number of different modes (also referred to as states). For example, the hitch assembly control system shown in U.S. Pat. No. 5,549,166 is operable in any of the following modes: an enable mode; a position mode; a draft mode; a hitch up mode; and a momentary actuation mode. The operation of the hitch assembly control system in these modes is described in the '166 patent, and also in the paper entitled "Electro-Hydraulic Draft Control (EDC) System Description for a Variety of Tractors", SAE-941764, by Abraham Orbach.

The two states of operation most pertinent to the present application are the position state and the draft state. In the position state, the hitch objective is set by the position control lever, and the hitch assembly is commanded to follow the commanded lever position, except that hitch upward motion is limited by the setting of a height control knob. The position state can exist whether the tractor is moving or stationary, and the position state is the basic hitch control for the tractor in that it is not an option. In the draft state, the hitch assembly is commanded to maintain a substantially constant draft on the tractor, and toward this end the hitch assembly is allowed to move elevationally within predetermined limits. The draft state can only exist when the tractor is moving and the tractor is equipped with appropriate draft sensors. Transition into the draft state can be accomplished from the position state.

The logic under which the hitch assembly control system of the '166 patent transitions from the position mode to the draft mode is shown in FIG. 11B of that patent. As shown, the system transitioned from the position mode to draft mode when the UP/DOWN switch was down, the tractor was moving, the remote switches were off, there was no DEGRADED2 fault (i.e., the draft force command knob and at least one of two draft force sensors were properly working), the draft option was installed on the tractor, and the sensed draft load was greater than the commanded draft load for more than a predetermined time period (e.g., 0.1 seconds). If these conditions were all true, then a transition from position to draft mode occurred.

The logic in FIG. 11B of the '166 patent was later modified to add an additional check before allowing the transition from position to draft mode. This added check, between steps 732 and 738 on the flowchart of FIG. 11B, verified that a desired or "target" hitch position was greater than the hitch position command before allowing the transition to draft mode, with the target hitch position determined based upon the settings of the load command knob and travel knob in the same manner as in draft mode, as described in the '166 patent and the "Electro-Hydraulic Draft Control (EDC) System Description for a Variety of Tractors" paper referenced above.

This added check, however, has proven inadequate due to the fact that the actual hitch position can lag behind the hitch position command. For example, if the operator raises the hitch on exiting a row using the position command knob, and then lowers the hitch using the position command knob upon re-entering the next row in the field, the actual hitch position will lag behind the hitch position command. Depending upon the drop rate, the hitch may take up to 12 seconds or so to be lowered all the way down to the commanded hitch position. In this case, the hitch position command will be below the target hitch position, but the actual hitch position will be above the target hitch position due to the time required to lower the hitch. Thus, despite the added check, the control system may still prematurely enter the draft mode even with the target hitch position less than the actual hitch position.

Accordingly, it would be desirable to modify the transition logic which governs the transition from the position mode to the draft mode to account for the lag between the actual hitch position and the hitch position command. It would also be desirable to modify the transition logic to prevent transition from the position mode into the draft mode when the target hitch position is below the actual hitch position.

SUMMARY OF THE INVENTION

An exemplary embodiment relates to a hitch assembly control system for an off-highway work vehicle equipped with a hitch assembly including a linkage assembly configured to be coupled to a ground-penetrating implement and a hitch actuator for raising and lowering the linkage assembly in response to a hitch control signal. The control system includes a position command device for generating a signal representative of a hitch position command, a draft force command device for generating a signal representative of a draft force command, a position sensor for generating a signal representative of a sensed hitch position, and a draft force sensor for generating a signal representative of a sensed draft force. The control system also includes a controller operable to generate the hitch control signal in one of a plurality of modes including a position mode and a draft mode, the hitch control signal based on the hitch position command and the sensed hitch position in the position mode and on the draft force command and the sensed draft force in the draft mode, and to apply the hitch control signal to the actuator to control movement of the linkage assembly. The controller, in the position mode, determines a target hitch position based at least partly on the draft force command, and transitions from the position to the draft mode at least partly based on a relationship between the target and sensed hitch positions.

Another embodiment relates to a hitch assembly control system for such a work vehicle, which includes a position command device for generating a signal representative of a hitch position command, a draft force command device for generating a signal representative of a draft force command, a position sensor for generating a signal representative of a sensed hitch position, and a draft force sensor for generating a signal representative of a sensed draft force. The control system also includes a controller operable to generate the hitch control signal in one of a plurality of modes including a position mode and a draft mode, the hitch control signal based on the hitch position command and the sensed hitch position in the position mode and on the draft force command and the sensed draft force in the draft mode, and to apply the hitch control signal to the actuator to control movement of the linkage assembly. The controller, in the position mode, determines a target hitch position which would apply if the controller were in the draft mode, and transitions from the position mode to the draft mode at least partly based upon the target hitch position being greater than both the hitch position command and the sensed hitch position.

Another embodiment relates to a method of transitioning between a position mode and a draft mode for a hitch assembly control system of a work vehicle including an actuator for raising and lowering a coupled implement in response to a hitch control signal. The method includes receiving a hitch position command signal, a draft force command signal, a sensed hitch position signal, and a sensed draft force signal. The method also includes operating in any of a plurality of modes including a position mode and a draft mode, the hitch control signal depending on the hitch position command signal and the sensed hitch position signal in the position mode and on the draft force command signal and the sensed draft force signal in the draft mode, and determining the present operation mode. The method also includes determining, in the position mode, a target hitch position which would apply if the controller were in the draft mode, and transitioning from the position mode to the draft mode at least partly based upon whether the target hitch position is greater than both the hitch position command and the sensed hitch position.

BRIEF DESCRIPTION OF THE DRAWINGS

The exemplary embodiments will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
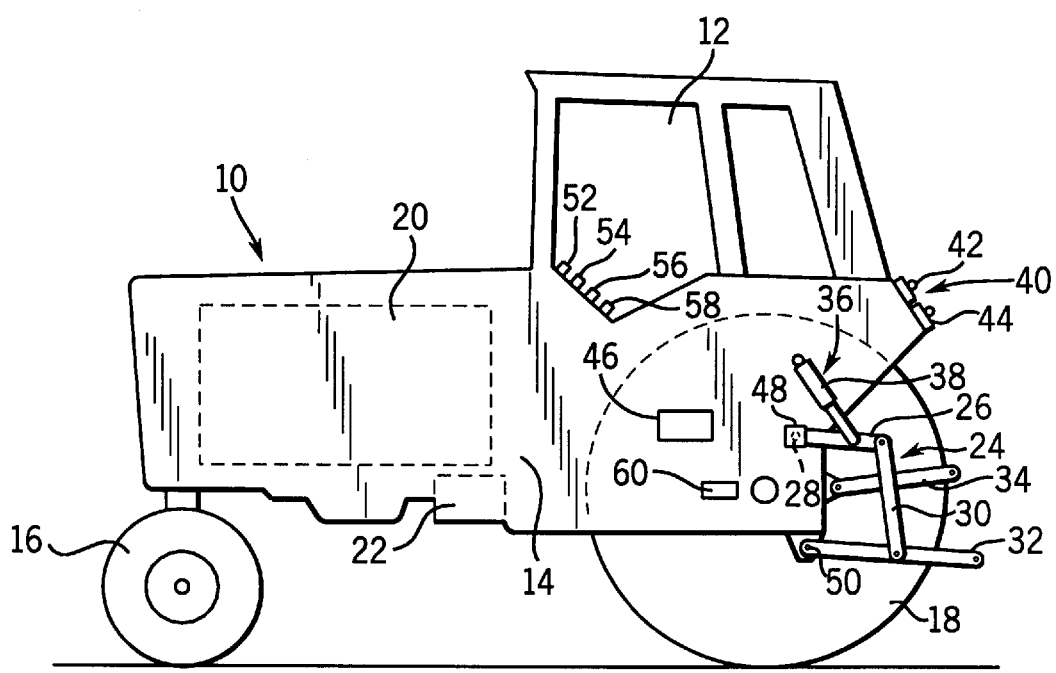
FIG. 1 is a simplified schematic illustration of an off-highway work vehicle such as an agricultural tractor which is equipped with a hitch assembly.

Referring to FIG. 1, an off-highway work vehicle 10, such as an agricultural tractor, includes an operator station 12 (i.e., cab) arranged on a frame 14 which is supported for movement across a field by a front pair of steerable wheels 16 and a rear pair of wheels 18. Wheels 18 are driven through a drive train including an engine 20 and a transmission (not shown) mounted on frame 14. Tractor 10 further includes an electrical system including a battery 22. It is to be appreciated, however, that the present invention is equally applicable to other forms of off-highway vehicles adapted to have hitch assemblies connected thereto such as, for example, bulldozers, articulated four-wheel drive tractors, front-wheel drive tractors, or other vehicles supported by tracks rather than wheels. For purposes of this description, the present invention will be described as being associated with an agricultural tractor.

Tractor 10 is provided with a hitch assembly 24 which connects a ground-penetrating assembly or other type of implement to a rear end of the tractor. The ground-penetrating assembly may be in the form of a conventional mold board plow or chisel plow. Alternative forms of ground-penetrating assemblies adapted to be towed behind tractor 10 may also be connected to assembly 24. Hitch assembly 24 is preferably a three-point hitch, including a pair of lift arms 26 which are each connected to and extend from a rock shaft 28. A pair of lift links 30 connect the other end of lift arms 26 to a pair of draft links 32. Hitch assembly 24 also includes an upper hitch link 34 having one end rotatably coupled to frame 14 of tractor 10. The position of draft links 32 and, thus, the elevation and working depth of the attached implement is controlled by hitch actuator 36. Hitch actuator 36 preferably includes at least one hydraulic cylinder 38 connected to lift arms 26. Hitch actuator 36 is responsive to input signals for controlling the elevation of draft links 32 of hitch assembly 24. Hitch assembly 24 is one example of a hitch mechanism to which the present invention applies and it will be appreciated by those skilled in the art that the present invention is equally applicable to other types of hitch mechanisms.

One embodiment of hitch assembly 24 includes a remote switch assembly 40 for manually controlling elevational movement of hitch assembly 24. As shown, remote switch assembly 40 preferably includes a pair of remote momentary switches 42 and 44 mounted away from operator station 12 of tractor 10 and the rear end thereof. Remote switch 42 constitutes a momentary up switch while remote switch 44 constitutes a momentary down switch. Alternatively, a two position switch assembly could be used rather than separate switches 42 and 44.

Informational data concerning the actual position of hitch assembly 24 is likewise provided to an on-board electronic control unit 46. A sensor 48, such as a conventional rotary potentiometer is used to monitor the angular disposition of rock shaft 28. The output signal generated by position sensor 48 represents the actual or sensed position of hitch assembly 24 and, by system geometry, also represents the position of the implement with respect to tractor 10. It should be appreciated that sensing the angular disposition of rock shaft 28 is merely exemplary of one method of monitoring or detecting the actual position of hitch assembly 24 and that alternative methods are well within the spirit and scope of the present invention.

After the implement has penetrated the ground, a draft force will be established from the implement/ground interaction. Hitch assembly 24 is provided with a draft sensor assembly 50 for sensing the draft force applied to hitch assembly 24 through implement/ground interaction. Draft sensor assembly 50 includes a pair of load cells arranged at the interface between left and right draft links 32 and frame 14. Alternatively, draft sensor assembly 50 may include a pair of sensors arranged in the left and right draft links 32 of assembly 24 to monitor or measure the draft force. Draft sensor assembly 50 is connected to and provides inputs to a microprocessor in electronic control unit 46. As will be appreciated, other sensor arrangements may be used for measuring the draft force applied to hitch assembly 24. For example, strain gauges, linear voltage displacement transducers (LVDTs), and the like may be used.

Shown schematically in FIG. 1 are four operator-actuatable input devices located within operator station 12, typically mounted on an armrest or other control console within easy reach of the operator. The first input device is a hitch position command lever or knob 52 coupled to a signal device such as a transducer or potentiometer for generating a position command signal for input to control unit 46. The second input device is a draft force command knob 54 coupled to a signal device such as a transducer or potentiometer for generating a draft command signal also for input to hitch control unit 46. Input devices 52 and 54 allow the tractor operator to set position and draft commands for the hitch. The third input device, also coupled to control unit 46, is a three-position rocker switch 56 with Up, DOWN and DOWNM positions to allow for direct hitch control between minimum and maximum heights. When switch 56 is moved to its Up position, the hitch to commanded to move to a raised position. When switch 56 is moved to its DOWN position, the hitch is commanded to move to its working position. Moving switch 56 to its DOWNM position can be used for entry into a calibration mode, to send a momentary down command to the hitch in a limp-home mode, or for entry into a float mode when in normal operation. The fourth input device is a travel knob 58 which controls the slope of hitch operation while operating in a draft state. Travel knob 58 serves to adjust the sensitivity of hitch response to variations in changing draft inputs. U.S. Pat. No. 5,549,166 further describes these and other operator input devices, and is incorporated herein by reference.

Control unit 46 also receives signals generated by a ground speed sensor 60 such as a ground speed radar which uses radar impulses to measure the speed of tractor 10 with respect to the ground. These signals are used by control unit 46 to determine if tractor 10 is moving or is stationary for the purposes described below. Alternatively, other sensors could be used for this purpose, such as a magnetic pickup sensor coupled to a toothed gear of the vehicle's transmission.

To accommodate different hitch performance objectives, hitch control unit 46 is designed to operate in different states or modes which are governed by the desired objective. For example, if the objective is to connect an implement to hitch assembly 24, a momentary mode is available to provide a command to control hitch motion in response to operator-activation of a momentary switch. In the momentary mode, hitch control unit 46 takes into account the fact that precise placement of the hitch draft links with respect to the implement is necessary. Therefore, the speed of motion of the hitch is provided at a relatively slow rate. Alternatively, the task of plowing at a constant draft load, related to a constant depth, requires a different control algorithm and therefore a different mode of operation. If the implement is being transported from one location to another as by driving the tractor or if the implement is raised at the end of a row upon turning, the hitch is to be operated in a hitch-up mode. As discussed above, the control unit for the hitch may operate in any of various states including enable, position, draft, hitch-up and momentary states.

Figure 4:
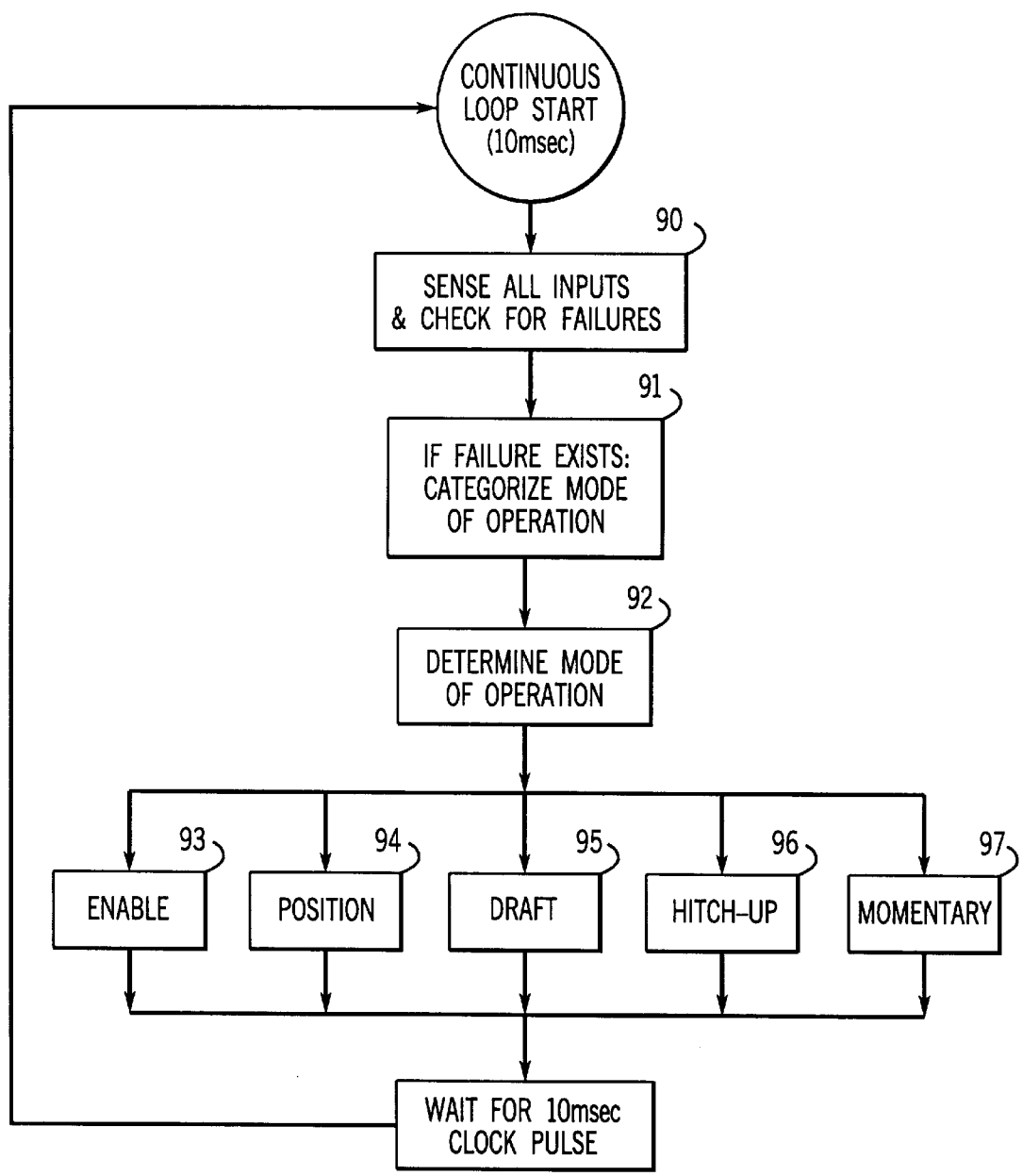
FIG. 4 is a flowchart showing various operational steps inherent with the control system for the hitch assembly shown in FIG. 1, and including logic for entering either enable, position, draft, hitch-up and momentary modes of operation.

Referring to FIG. 4, the electronic draft control system utilizes a continuous operational loop repeated every ten (10) msec after a short initialization interval. The steps performed in the loop, as shown in FIG. 4, include sensing all inputs and checking for failures at step 90, executing failure mode logic if a failure exists at step 91, determining the mode of operation at step 92, controlling the hitch in the determined mode at one of steps 93–97, and returning to the beginning of the loop at the next 10 msec clock pulse, wherein the loop is continually repeated.

In one embodiment, the hitch control system may operate in any of five operational states, including an enable state 93, a position state 94, a draft state 95, a hitch-up state 96 and a momentary state 97. Enable state 93 is the state to which the system transitions immediately after initialization. In this state, the actual position of the hitch is checked with respect to the commanded position and, to transition out of the enable state, the operator must "capture" the hitch using either the hitch position control lever or the height control knob. In the position state 94, the hitch position objective is set by a hitch position control lever, and the hitch assembly follows the commanded lever position except upward hitch movement is limited by the setting of the height control knob. Position state 94 can exist when the tractor is moving or stationary, and is the basic hitch control of the tractor since it is not an option. In the draft state 95, the hitch assembly is commanded to maintain a substantially constant draft force by elevational movement of the hitch within predetermined limits. Draft state 95 can exist only when the tractor is moving, and only if tractor 10 is equipped with needed controls and sensors. Transition into draft state 95 can be accomplished only from the position state 94. In the hitch-up state 96, the hitch assembly can be commanded under the influence of an UP/DOWN rocker switch, or other control. When the switch is transitioned from its DOWN position to its UP position, the hitch assembly will move upwardly to one of two positions, either the maximum hitch position range available if the height control knob does not exist, or the hitch height commanded by the height control knob. It is desirable for the hitch assembly to move smoothly to its maximum position within a certain time period. For example, full hitch stroke is accomplished within 2.25 seconds using a hitch cylinder volume of 163 cubic inches and having the throttle lever position of the tractor at maximum. In the momentary state 97, the hitch assembly is commanded to move under the influence of remote switches 42 and 44, or an up/down rocker switch in its momentary position, or other controls within operator station 12. In momentary state 97, it is desirable to move the hitch up or down, depending on the command, at a predetermined rate.

Figure 2:
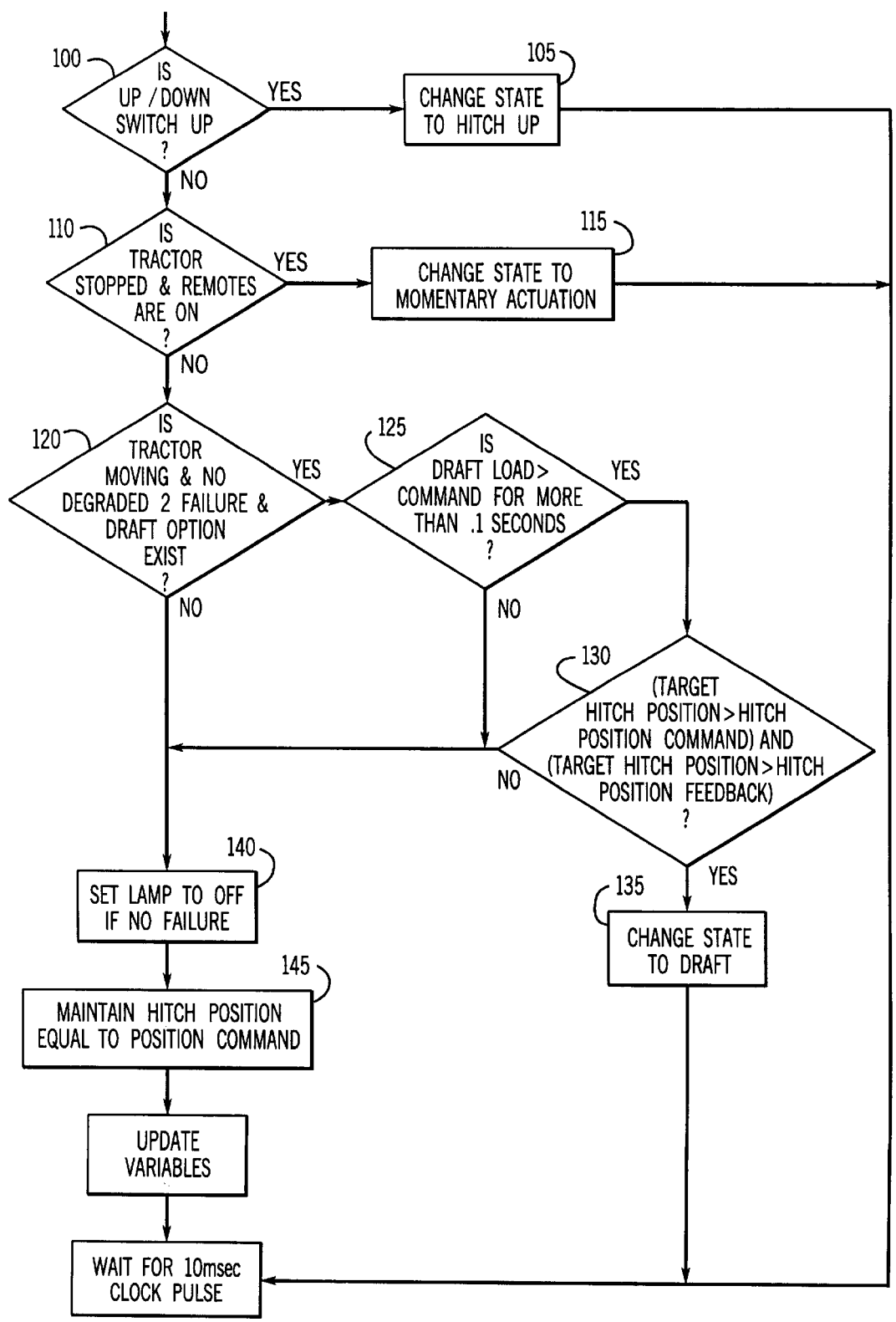
FIG. 2 is a flowchart depicting various operational steps inherent with the control system for the hitch assembly shown in FIG. 1, and including logic for transitioning from a position mode of operation to a draft mode of operation.

Referring to FIG. 2, a flow diagram illustrates the steps for allowing the program for hitch control unit 46 to switch or transition from the position state 94 to either the hitch-up state 96, momentary actuation state 97 or to draft state 95. FIG. 2 is used in place of FIG. 11B of U.S. Pat. No. 5,549,166, and includes the modified logic of the present invention. An initial step 100 in the transition process from the position state determines whether UP/DOWN/DOWNM switch 56 is positioned in the UP position. If so, the program shifts to step 105 which changes or shifts the state of operation for hitch assembly 24 to the hitch-up state 96 on the next loop. If the switch assembly is not in the UP position, step 100 directs the program to step 110.

At step 110, an evaluation is made as to whether the tractor 10 is stopped (using the signals generated by ground speed radar 60) and whether either remote switch 42 or 44 is actuated. If so, the program shifts to step 115 to change the state of operation of the hitch assembly to the momentary actuation state 97 upon the next time loop of the program. If not, the program shifts to step 120.

At step 120, an evaluation is made as to whether tractor 10 is moving as detected by ground speed radar 60, and that no DEGRADED2 failure has been detected (i.e., draft force command knob 54 and at least one of the two draft force sensors 50 are properly working), and that the draft operation exists on tractor 10. If so, the program is directed to step 125. If each of the conditions evaluated at step 120 are not satisfied, the program is directed to step 140. At step 140, the program directs an indicator lamp to be turned off if there have been no failures of the system. After step 140, at step 145 the program directs the hitch control unit to maintain the elevational position of hitch assembly 24 equal to a position set for the hitch assembly as a function of the position of the hitch command mechanisms. Then, upon updating variables, hitch control unit 46 waits for the next 10 msec clock pulse.

Turning now to step 125, an evaluation is made as to whether the draft load as sensed by draft load sensor assembly 50 is greater than the draft command set by the operator on draft force command knob 54. Step 125 further analyzes whether the sensed draft force sensed by sensor assembly 50 is greater than the draft command set by command knob 54 for a specified time period which, preferably, is greater than 0.1 seconds. If the conditions analyzed in step 125 are satisfied, the program shifts to step 130. If not, the program continues at step 140, operating as described above.

At step 130, hitch control unit 46 compares a desired or "target" hitch position with the hitch position command set by the operator using position command lever 52 and determines if the target hitch position is greater than the hitch position command, and also compares the target hitch position with the hitch position feedback (i.e., the actual position of the hitch) detected by position sensor 48 to determine whether the target hitch position also exceeds the hitch position feedback. If both of these conditions exist, the state of the control unit 46 is transitioned from the position mode 94 to the draft mode 95 at step upon the next time loop of the program. On the other hand, if the conditions analyzed in either steps 125 or 130 are not satisfied, the program shifts from step 125 or 130 to step 140 and the program proceeds as discussed above without transitioning from the position mode of operation.

The desired or target hitch position is determined by control unit 46 based on the settings of draft force or load command knob 54 and travel knob 58. The logic calculates a target hitch position (as in draft mode) using the travel line and load command set by knobs 54 and 58 as described in both U.S. Pat. No. 5,549,166 and the "Electro-Hydraulic Draft Control (EDC) System Description for a Variety of Tractors" paper referenced herein. The logic then insures this target hitch position is greater than both the hitch position command and the hitch position feedback before allowing a transition from the position mode 94 to the draft mode 95 at step 135.

The logic of step 130 accounts for lag in actual hitch position behind the hitch position command under certain circumstances. For example, assume the operator raises the hitch on exiting a row using position command lever 52, and then lowers the hitch using the lever 52 upon re-entering the next row in the field. In this case, actual hitch position will lag behind the hitch position command due to the drop rate of the hitch. Depending upon the hitch drop rate, which can be influenced by the operator using a drop rate knob (not shown), the hitch may take a relatively long time (e.g., up to 12 seconds) to be lowered all the way down to the commanded hitch position. In this situation, even though the hitch position command (set by position command lever 52) will be less than (i.e., below) the target hitch position, actual hitch position (sensed by position sensor 48) will lag above the target hitch position due to the time required to lower the hitch. Thus, during this time period, the logic in step 130 will prevent the control unit from transitioning from the position mode of operation to the draft mode until the hitch position feedback drops below the target hitch position. At that point, since the target hitch position exceeds (i.e., is above) both the hitch position command and the hitch position feedback, the transition into draft mode will occur. By preventing the premature transition into draft mode during the time that the actual hitch position is still above the target hitch position that would apply in draft mode, the control advantageously remains in the position mode until the actuator lowers the hitch to a position where use of draft mode becomes appropriate.

Figure 3:
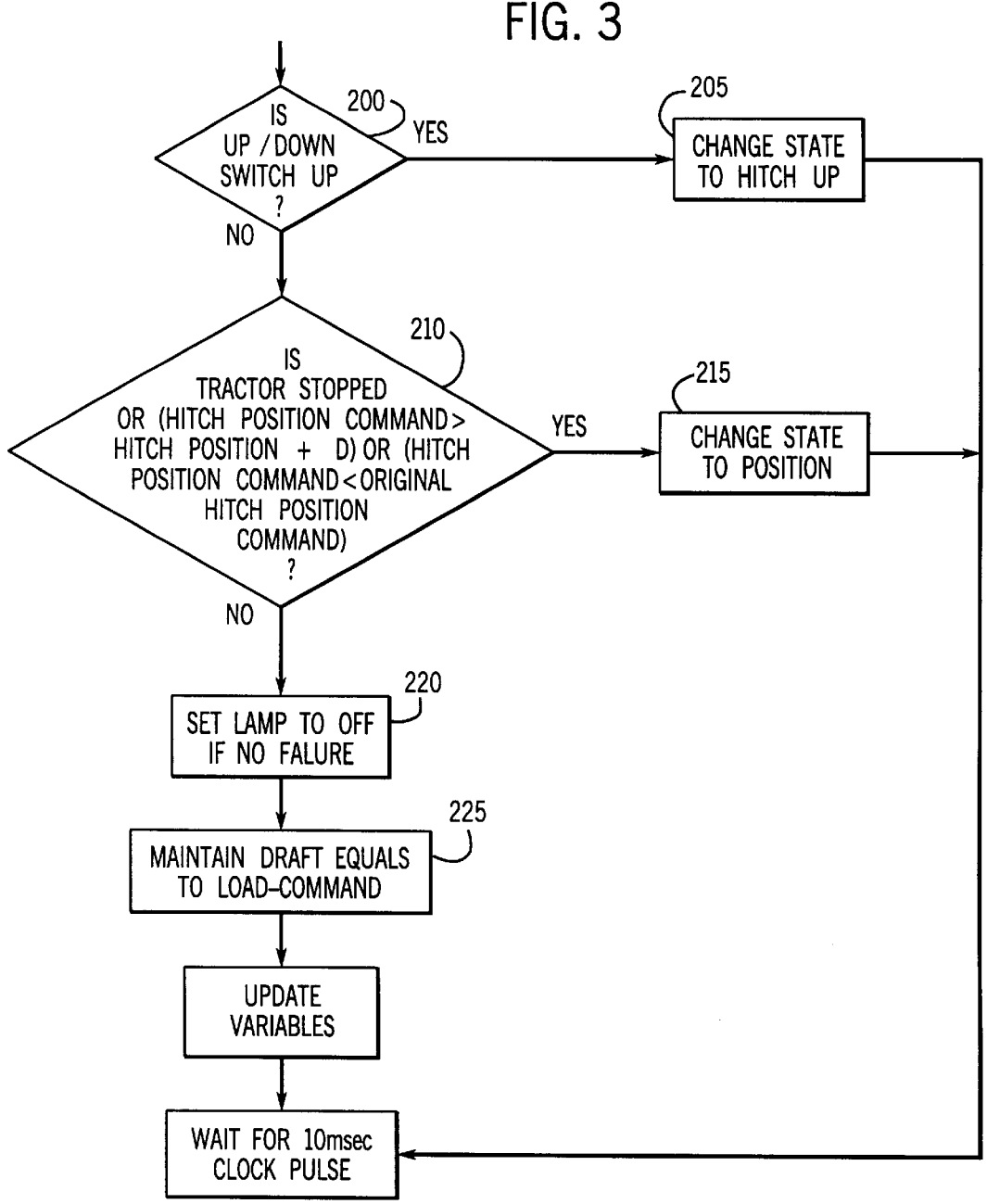
FIG. 3 is a flowchart depicting various operational steps inherent with the control system for the hitch assembly shown in FIG. 1, and including logic for transitioning from a draft mode of operation to a position mode of operation.

Referring now to FIG. 3, the steps utilized to allow the program for the hitch assembly to switch or transition from draft mode 95 to either hitch-up mode 96 or position mode 94 are depicted. FIG. 3 is used in place of FIG. 11C of U.S. Pat. No. 5,549,166, and includes modified logic. An initial step 200 in the transition process from draft mode 95 determines whether UP/DOWN/DOWNM switch 56 is in the UP position. If the switch assembly is positioned UP, the program shifts to step 205 so that the mode of operation for the hitch assembly shifts or transitions to the hitch-up mode 96 upon the next time loop of the program. On the other hand, if the switch assembly 56 is not in the UP position, the program is directed to step 210.

At step 210, an evaluation is made of whether the tractor is stopped, or if the hitch position command is greater than the hitch position plus a hysterisis factor (delta or "d"), or if the hitch position command is less than the original hitch position command that was commanded and stored when the control system transitioned into the draft mode 95 (which was saved in memory by control unit 46). If the outcome of step 210 is true, the hitch assembly shifts or changes to position mode 94 in step 215. If not, the hitch assembly remains in draft mode 95 during the consecutive time loop of the program and also executes steps 220 and 225, wherein the program directs the indicator light to be off if there have been no failures, and to maintain a substantially constant load on hitch assembly 24 during operation of the implement. With the indicator light off, the operator is provided with a visual indication that the system remains operational to elevationally position the hitch assembly.

Referring again to step 210, any of three conditions cause the transition from draft mode 95 to position mode 94. The first condition is when the tractor is stopped as indicated by ground speed sensor 60 or other suitable device. The second condition is when the operator raises the hitch so that the hitch position command is higher than the actual hitch position plus an added hysteresis factor. In this situation, it is desirable to use position control rather than draft control because the position command is driving the change. The third condition is when the actual hitch position is at a point in a substantially middle position and the hitch position command is also for that middle position, but the draft mode 95 calculation indicates that the target hitch position is at a point considerably below the present position. If the operator were to then turn the position command down to command the hitch to lower without transitioning to position mode 94, the hitch would lower at a rate based upon the difference between the target hitch position and the actual hitch position rather than at a rate based upon a slight lowering of the position command that the operator made. Therefore, the error is considerably large and the hitch will tend to drop and catch itself, and drop and catch itself, repeatedly. The third condition provides smoother operation because the hitch control transitions to the position mode thereby removing the catch and drop operation that would otherwise be caused by draft mode 95.

The transition logic described with respect to steps 130 and 210 may be embodied in a computer program. A listing of an exemplary computer program implementing the transitioning logic of steps 130 and 210 is attached as Appendix A.

While the drawings, specific examples, and particular formulations given describe preferred embodiments of the invention, they serve the purpose of illustration only. For example, control methodologies, algorithms, and mathematical models of physical systems may differ depending on chosen control characteristics and the physical characteristics of the work vehicle or implement. The apparatus of the invention is not limited to the precise details and conditions shown. Furthermore, other substitutions, modifications, changes, and omissions may be made in the design, operating conditions, and arrangement of the preferred embodiments without departing from the spirit of the invention as expressed in the appended claims.

What is claimed is:

1. In an off-highway work vehicle equipped with a hitch assembly including a linkage assembly configured to be coupled to a ground-penetrating implement and a hitch actuator for raising and lowering the linkage assembly in response to a hitch control signal, a hitch assembly control system comprising:

an operator-actuatable position command device for generating a signal representative of a hitch position command;

an operator-actuatable draft force command device for generating a signal representative of a draft force command;

a position sensor coupled to the hitch assembly for generating a signal representative of a sensed hitch position;

a draft force sensor coupled to the hitch assembly for generating a signal representative of a sensed draft force; and a controller coupled to the position command device, the draft force command device, the position sensor, the draft force sensor and the hitch actuator, the controller being operable to generate the hitch control signal in one of a plurality of modes including a position mode and a draft mode, the hitch control signal based on the hitch position command and the sensed hitch position in the position mode and on the draft force command and the sensed draft force in the draft mode, and to apply the hitch control signal to the actuator to control movement of the linkage assembly;

wherein the controller is further configured, in the position mode, to determine a target hitch position based at least partly on the draft force command, and to transition from the position mode to the draft mode at least partly based upon a relationship between the target hitch position and the sensed hitch position and the transition from the position mode to the draft mode requires the target hitch position to be greater than the sensed hitch position.

2. The hitch assembly control system of claim 1, wherein the transition from the position mode to the draft mode requires the target hitch position to be greater than the sensed hitch position.

3. The hitch assembly control system of claim 1, wherein the transition from the position mode to the draft mode also requires the target hitch position to be greater than the hitch position command.

4. The hitch assembly control system of claim 3, wherein the transition from the position mode to the draft mode also requires the sensed draft force to be greater than the draft force command.

5. The hitch assembly control system of claim 4, wherein the transition from the position mode to the draft mode requires the sensed draft force to be greater than the draft force command for more than a predetermined time period.

6. The hitch assembly control system of claim 3, also comprising a work vehicle velocity sensor coupled to the controller, wherein the transition from the position mode to the draft mode also requires the work vehicle to be moving.

7. The hitch assembly control system of claim 3, also comprising a remote switch assembly located outside a cab of the work vehicle and coupled to the controller for remotely commanding movement of the linkage assembly, wherein the transition from the position mode to the draft mode also requires the remote switch assembly to be positioned so as not to command movement of the linkage assembly.

8. The hitch assembly control system of claim 3, also comprising an operator-actuatable switch assembly coupled to the controller having up and down positions for commanding the linkage assembly to be raised and lowered to maximum and minimum heights, respectively, wherein the transition from the position mode to the draft mode also requires the switch assembly to be actuated to the down position.

9. In an off-highway work vehicle equipped with a hitch assembly including a linkage assembly configured to be coupled to a ground-penetrating implement and a hitch actuator for raising and lowering the linkage assembly in response to a hitch control signal, a hitch assembly control system comprising:

an operator-actuatable position command device for generating a signal representative of a hitch position command;

an operator-actuatable draft force command device for generating a signal representative of a draft force command;

a position sensor coupled to the hitch assembly for generating a signal representative of a sensed hitch position;

a draft force sensor coupled to the hitch assembly for generating a signal representative of a sensed draft force;

a controller coupled to the position command device, the draft force command device, the position sensor, the draft force sensor and the hitch actuator, the controller being operable to generate the hitch control signal in one of a plurality of modes including a position mode and a draft mode, the hitch control signal based on the hitch position command and the sensed hitch position in the position mode and on the draft force command and the sensed draft force in the draft mode, and to apply the hitch control signal to the actuator to control movement of the linkage assembly; and an operator-actuatable travel command device coupled to the controller, wherein the controller, in the position mode, determines the target hitch position based upon the draft force command and the setting of the travel command device, wherein the controller is further configured, in the position mode, to determine a target hitch position based at least partly on the draft force command, and to transition from the position mode to the draft mode at least partly based upon a relationship between the target hitch position and the sensed hitch position.

10. In an off-highway work vehicle equipped with a hitch assembly including a linkage assembly configured to be coupled to a ground-penetrating implement and a hitch actuator for raising and lowering the linkage assembly in response to a hitch control signal, a hitch assembly control system comprising:

an operator-actuatable position command device for generating a signal representative of a hitch position command;

an operator-actuatable draft force command device for generating a signal representative of a draft force command;

a position sensor coupled to the hitch assembly for generating a signal representative of a sensed hitch position;

a draft force sensor coupled to the hitch assembly for generating a signal representative of a sensed draft force; and a controller coupled to the position command device, the draft force command device, the position sensor, the draft force sensor and the hitch actuator, the controller being operable to generate the hitch control signal in one of a plurality of modes including a position mode and a draft mode, the hitch control signal based on the hitch position command and the sensed hitch position in the position mode and on the draft force command and the sensed draft force in the draft mode, and to apply the hitch control signal to the actuator to control movement of the linkage assembly;

wherein the controller is further configured, in the position mode, to determine a target hitch position based at least partly on the draft force command, and to transition from the position mode to the draft mode at least partly based upon a relationship between the target hitch position and the sensed hitch position, the transition from the draft mode to the position mode depends upon whether the hitch position command is greater than the sensed hitch position and the controller is also configured to transition from the draft mode to the position mode.

11. The hitch assembly control system of claim 10, wherein the transition from the draft mode to the position mode depends upon whether the hitch position command is greater than the sensed hitch position plus a hysteresis value.

12. In an off-highway work vehicle equipped with a hitch assembly including a linkage assembly configured to be coupled to a ground-penetrating implement and a hitch actuator for raising and lowering the linkage assembly in response to a hitch control signal, a hitch assembly control system comprising:

an operator-actuatable position command device for generating a signal representative of a hitch position command;

an operator-actuatable draft force command device for generating a signal representative of a draft force command;

a position sensor coupled to the hitch assembly for generating a signal representative of a sensed hitch position;

a draft force sensor coupled to the hitch assembly for generating a signal representative of a sensed draft force; and a controller coupled to the position command device, the draft force command device, the position sensor, the draft force sensor and the hitch actuator, the controller being operable to generate the hitch control signal in one of a plurality of modes including a position mode and a draft mode, the hitch control signal based on the hitch position command and the sensed hitch position in the position mode and on the draft force command and the sensed draft force in the draft mode, and to apply the hitch control signal to the actuator to control movement of the linkage assembly;

wherein the controller is further configured, in the position mode, to determine a target hitch position based at least partly on the draft force command, and to transition from the position mode to the draft mode at least partly based upon a relationship between the target hitch position and the sensed hitch position, the transition from the draft mode to the position mode depends upon whether the hitch position command is less than the hitch position command that existed upon entry into the draft mode, and, the controller is also configured to transition from the draft mode to the position mode.

13. In an off-highway work vehicle equipped with a hitch assembly including a linkage assembly configured to be coupled to a ground-penetrating implement and a hitch actuator for raising and lowering the linkage assembly in response to a hitch control signal, a hitch assembly control system comprising:

an operator-actuatable position command device for generating a signal representative of a hitch position command;

an operator-actuatable draft force command device for generating a signal representative of a draft force command;

a position sensor coupled to the hitch assembly for generating a signal representative of a sensed hitch position;

a draft force sensor coupled to the hitch assembly for generating a signal representative of a sensed draft force; and a controller coupled to the position command device, the draft force command device, the position sensor, the draft force sensor and the hitch actuator, the controller being operable to generate the hitch control signal in one of a plurality of modes including a position mode and a draft mode, the hitch control signal based on the hitch position command and the sensed hitch position in the position mode and on the draft force command and the sensed draft force in the draft mode, and to apply the hitch control signal to the actuator to control movement of the linkage assembly; and a work vehicle velocity sensor coupled to the controller, wherein the controller is further configured, in the position mode, to determine a target hitch position based at least partly on the draft force command, and to transition from the position mode to the draft mode at least partly based upon a relationship between the target hitch position and the sensed hitch position, the transition from the draft mode to the position mode depends upon the work vehicle being stationary, and the controller is also configured to transition from the draft mode to the position mode.

14. In an off-highway work vehicle equipped with a hitch assembly including a linkage assembly configured to be coupled to a ground-penetrating implement and a hitch actuator for raising and lowering the linkage assembly in response to a hitch control signal, a hitch assembly control system comprising:

an operator-actuatable position command device for generating a signal representative of a hitch position command;

an operator-actuatable draft force command device for generating a signal representative of a draft force command;

a position sensor coupled to the hitch assembly for generating a signal representative of a sensed hitch position;

a draft force sensor coupled to the hitch assembly for generating a signal representative of a sensed draft force; and a controller coupled to the position command device, the draft force command device, the position sensor, the draft force sensor and the hitch actuator, the controller being operable to generate the hitch control signal in one of a plurality of modes including a position mode and a draft mode, the hitch control signal based on the hitch position command and the sensed hitch position in the position mode, and on the draft force command and the sensed draft force in the draft mode, and to apply the hitch control signal to the actuator to control movement of the linkage assembly;

wherein the controller is further configured, in the position mode, to determine a target hitch position which would apply if the controller were in the draft mode, and to transition from the position mode to the draft mode at least partly based upon the target hitch position being greater than both the hitch position command and the sensed hitch position.

15. The hitch assembly control system of claim 14, wherein the transition from the position mode to the draft mode also requires the sensed draft force to be greater than the draft force command.

16. A method of transitioning between a position mode of operation and a draft mode of operation for a hitch assembly control system of a work vehicle, the hitch assembly control system including a hitch actuator for raising and lowering a coupled implement in response to a hitch control signal, the method comprising:

receiving a hitch position command signal;

receiving a draft force command signal;

receiving a sensed hitch position signal;

receiving a sensed draft force signal;

operating in any of a plurality of modes including a position mode and a draft mode, wherein the hitch control signal depends on the hitch position command signal and the sensed hitch position signal in the position mode and depends on the draft force command signal and the sensed draft force signal in the draft mode;

determining the present mode of operation;

determining, in the position mode, a target hitch position which would apply if the controller were in the draft mode; and transitioning from the position mode to the draft mode at least partly based upon whether the target hitch position is greater than both the hitch position command and the sensed hitch position.

17. The method of claim 16, wherein the transitioning step is also based upon whether the sensed draft force is greater than the draft force command.

* * * * *